United States Patent [19]

Fleischer

[11] 3,715,680

[45] Feb. 6, 1973

[54] ACTIVE RC LOSS EQUALIZER

[75] Inventor: Paul Egon Fleischer, Little Silver, N.J.

[73] Assignee: Bell Telephone Laboratories, Incorporated, Murray Hill, N.J.

[22] Filed: July 29, 1971

[21] Appl. No.: 167,242

[52] U.S. Cl. ....................330/107, 330/109, 333/28 R

[51] Int. Cl. ....................H03f 1/36

[58] Field of Search ....................330/21, 31, 107, 109; 333/28 R

[56] References Cited

UNITED STATES PATENTS

| | | | |
|---|---|---|---|
| 3,551,872 | 12/1970 | Emmott et al. | 338/202 |
| 3,348,171 | 10/1967 | Kawashima et al. | 333/28 R |

OTHER PUBLICATIONS

Tow, "A Step-By-Step Active-Filter Design," IEEE Spectrum, December, 1969, pp. 64–68.

*Primary Examiner*—Roy Lake
*Assistant Examiner*—James B. Mullins
*Attorney*—R. J. Guenther et al.

[57] ABSTRACT

An active resistance-capacitance (RC) loss equalizer circuit which provides a second order "bump" in the frequency domain is disclosed. The bump height, bump width, and bump center frequency are independently adjustable by sliding switches which alter predetermined circuit resistor values. The equalizer circuit is preferably realized using operational amplifiers bonded to a thin film circuit substrate.

13 Claims, 10 Drawing Figures

ACTIVE RC LOSS EQUALIZER

BACKGROUND OF THE INVENTION

This invention pertains to active equalizer circuits and, more particularly, to resistance-capacitance (RC) active loss equalizer circuits.

The transmission of digital and analog information over voiceband channels requires that the loss, i.e., attenuation, of the communication cables be sufficiently small so as not to corrupt the information being transmitted. Of course, no cable is ideal and is thus subject to variation in signal transmission characteristics with changes in signal frequency; it thus becomes necessary to equalize the channel, i.e., introduce certain amounts of gain in selected portions of the signal frequency spectrum to compensate for any loss introduced by the cable.

In one prior art proposal, a family of ten passive adjustable equalizer networks yielding a total of 68 different gain configurations is used to equalize voiceband transmission cables. These networks are bridged-T constant resistance bump equalizers, each network being tuned to a bump center frequency within the signal frequency spectrum. The height and the width of the bump produced by a single network is simultaneously controlled by an adjustable resistor. A discussion of bump equalizers may be found in the article entitled "Equalizing and Main Station Repeaters," Bell System Technical Journal, April, 1969, pp. 889, 895, et seq., and on p. 384 of Transmission Systems for Communications, authored by Members of the Technical Staff, Bell Telephone Laboratories, 1970. The selection of the appropriate set of equalizers from the family of equalizers and the various settings for the bump heights and widths are generally determined by use of a computer program. Depending upon a given cable or line, anywhere from one to 12 cascaded equalizers may be required to compensate for loss in the line. The requirement for this unduly large number of equalizers is at least partly due to the fact that the bump heights and widths are not separately adjustable. The expense of equalizing a cable is therefore increased and a lengthy period of time required to adjust all of the various equalizers to obtain the desired performance.

It is an object of this invention to improve upon prior art equalization schemes by utilizing a relatively small number of equalizers having a wide variety of independently adjustable bump heights, bump widths, and bump center frequencies.

SUMMARY OF THE INVENTION

This, and other objects, are accomplished in accordance with the principles of this invention by using an active RC equalizer circuit which has a biquadratic transfer function. Such circuits are generally referred to as "biquads." This type of equalizer provides a second order bump in the frequency domain and is most advantageously realized using beam leaded operational amplifiers bonded to a thin film circuit substrate. The bump height, bump width, and bump center frequency of each equalizer are independently adjustable by resistive tuning, using sliding switches which make contact with the terminals of thin film resistors on the substrate. Various network configurations are employed to reduce the number of circuit elements and thereby reduce the size and cost of the equalizer circuit.

DETAILED DESCRIPTION

Figure 1:
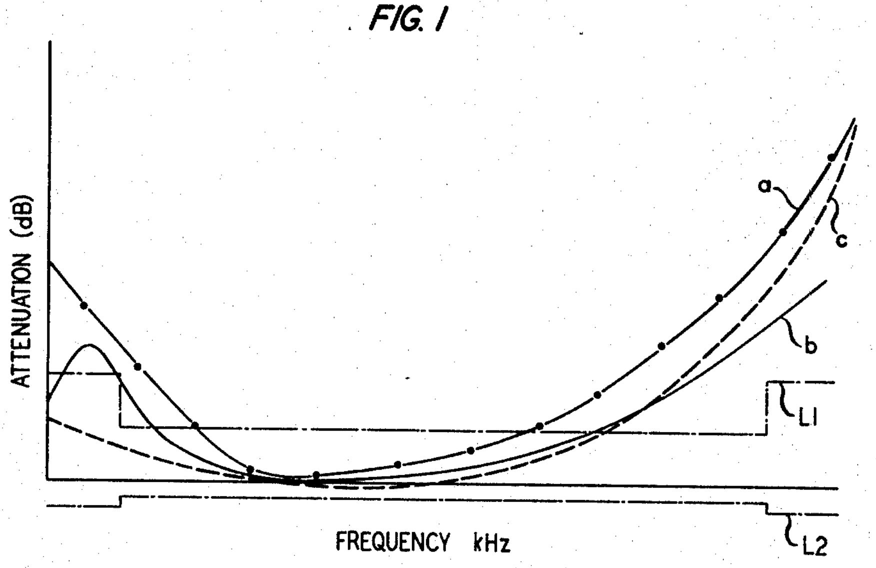
FIG. 1 illustrates typical cable attenuation curves of a signal transmission system and preferred attenuation limits for such a system.
Figure 2:
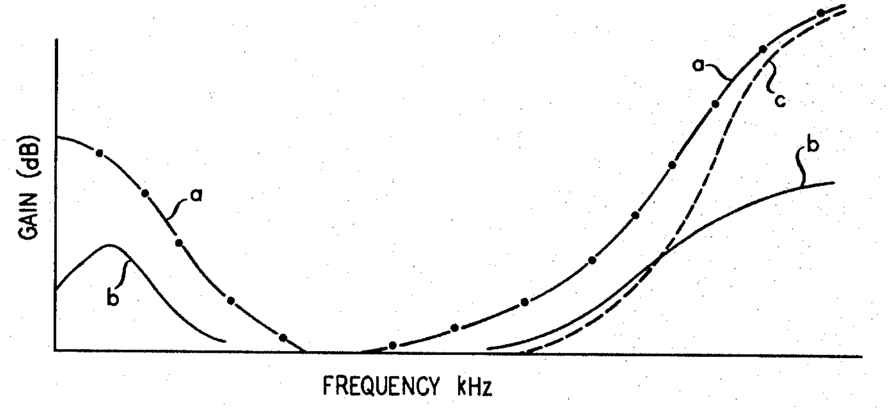
FIG. 2 illustrates various equalizer responses necessary to compensate for the cable attenuation represented by the curves of FIG. 1.

FIG. 1 illustrates typical cable attenuation (loss) curves for a voiceband transmission system. Curves L-1 and L-2 define a region of desired performance for voiceband cable circuits, i.e., they represent the typical outer limits of cable loss with respect to the loss at 1 kHz. that have been found acceptable from a signal transmission standpoint. Since, as illustrated, the loss to be equalized peaks at the edges of the signal frequency band, bump equalizers having gain peaks at these edges of the band may be used to equalize the channels of the voiceband circuits. It will be noted that since the mid-band frequencies fall within the limits of desired performance, it is necessary to separately equalize the low and high frequency signal bands. The composite equalizer bump shapes shown in FIG. 2 will equalize the loss curves of FIG. 1. Corresponding compensating loss and gain curves are identified by the same letter, for example, *a*, *b*, and *c*. The cable represented by loss curve *c* requires no low frequency compensation as indicated.

Figure 3:
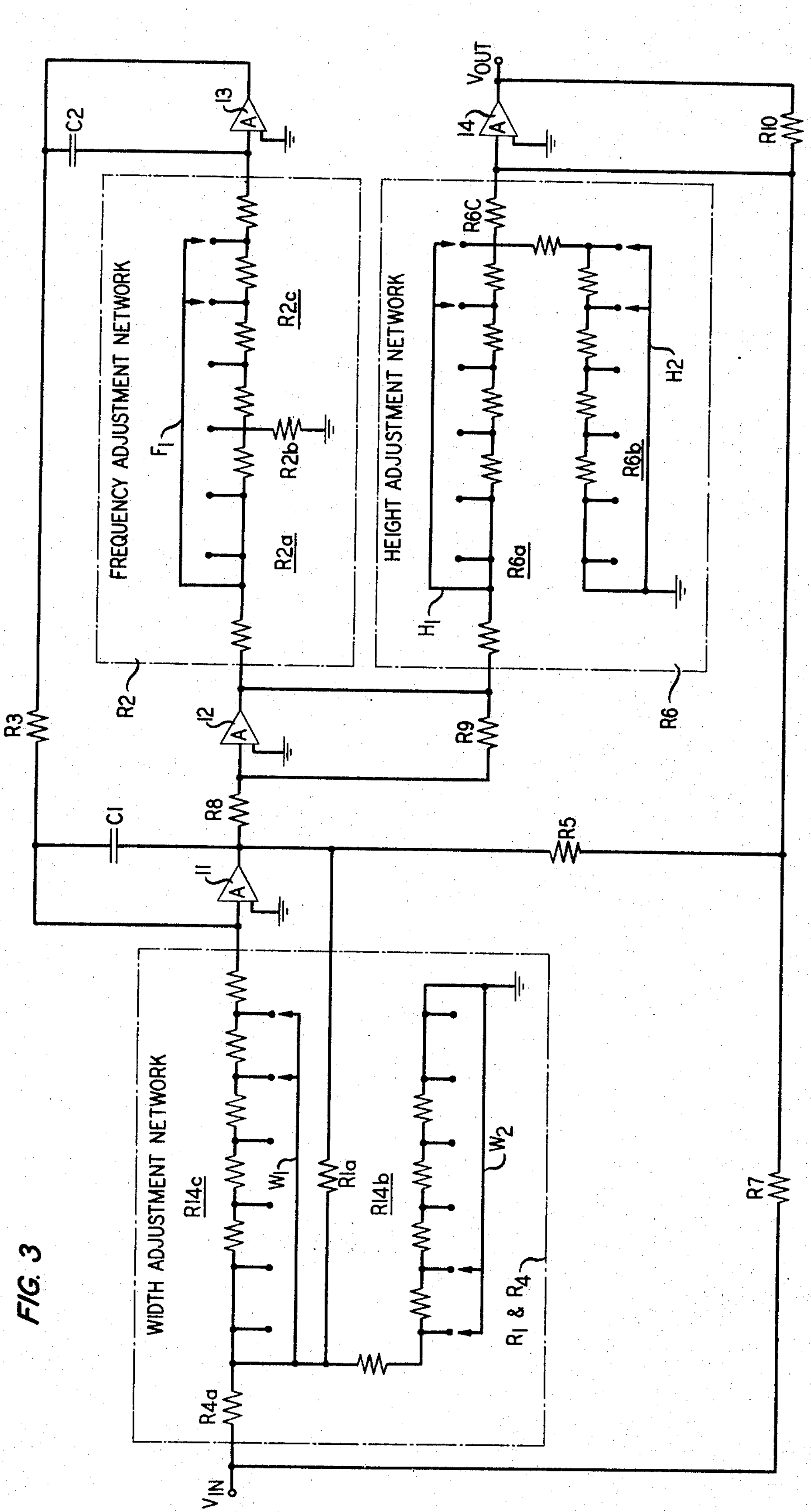
FIG. 3 illustrates the loss equalizer circuit of this invention.
Figure 4:
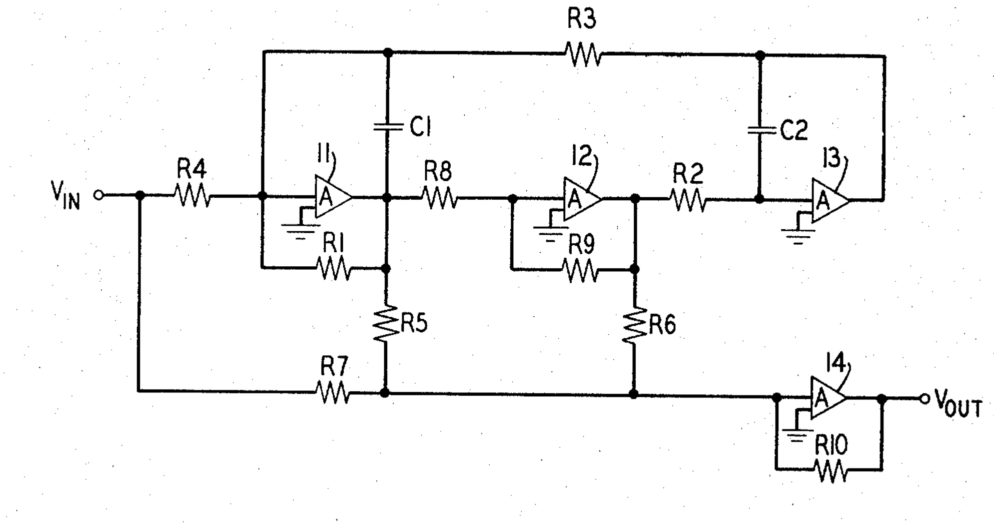
FIG. 4 illustrates a simplified equivalent circuit of the loss equalizer circuit of FIG. 3.

FIG. 3 depicts an active RC equalizer circuit, embodying the principles of this invention, which may be used to equalize voiceband and other cable circuits. The equalizer circuit shown provides a second order bump in the frequency domain. The bump height, bump width, and bump center frequency are independently adjustable. FIG. 4 is a simplified equivalent circuit of the equalizer of FIG. 3, the operation of which will aid in the understanding of the operation of this invention. Like or analogous elements have been identically identified. This circuit topology has been referred to as a biquad since it realizes an arbitrary biquadratic transfer function. Design equations and other relevant data concerning biquads may be found in the article entitled "Active RC Filters - A State Space Realization" authored by J. Tow, appearing in the Proceedings of the IEEE, June, 1968, p. 1137.

Feedback operational amplifiers 11, 12, and 13, in conjunction with resistor $R_3$, form a feedback loop which provides the pair of complex poles of the overall transfer function between input and output terminals $V_{in}$ and $V_{out}$. The zeros of the transfer function are formed by feedback operational amplifier 14 and its associated circuitry.

It may be shown that the transfer function T(s) of the circuit of FIG. 4 is given by:

$$T(s)=\frac{V_{\text{out}}}{V_{\text{in}}}=-\frac{R_{10}}{R_7}\frac{\left(\frac{R_{10}}{R_6}\cdot\frac{R_9}{R_8}-\frac{R_{10}}{R_5}\right)\frac{1}{R_4C_1}s}{s^2+\frac{1}{R_1C_1}s+\frac{R_9}{R_8R_2R_3C_1C_2}} \quad (1)$$

If we let $$R_{10}=R_7, \quad (2a)$$

$$R_8=R_9, \text{ and} \quad (2b)$$

$$R_4=R_1, \quad (2c)$$

then the transfer function becomes $$T(s)=-(s^2+h\,\alpha\,s+\omega_o^2/s^2+\alpha\,s+\omega_o^2), \quad (3)$$

where $$\alpha=1/R_1C_1 \text{ (width)} \quad (4a)$$

$$\omega_o^2=1/R_2R_3C_1C_2 \text{ (resonant frequency)} \quad (4b)$$

$$h=1+R_{10}(G_6-G_5) \text{ (height)} \quad (4c)$$

$$G_6=1/R_6\ G_5=1/R_5. \quad (4d)$$

Figure 9:
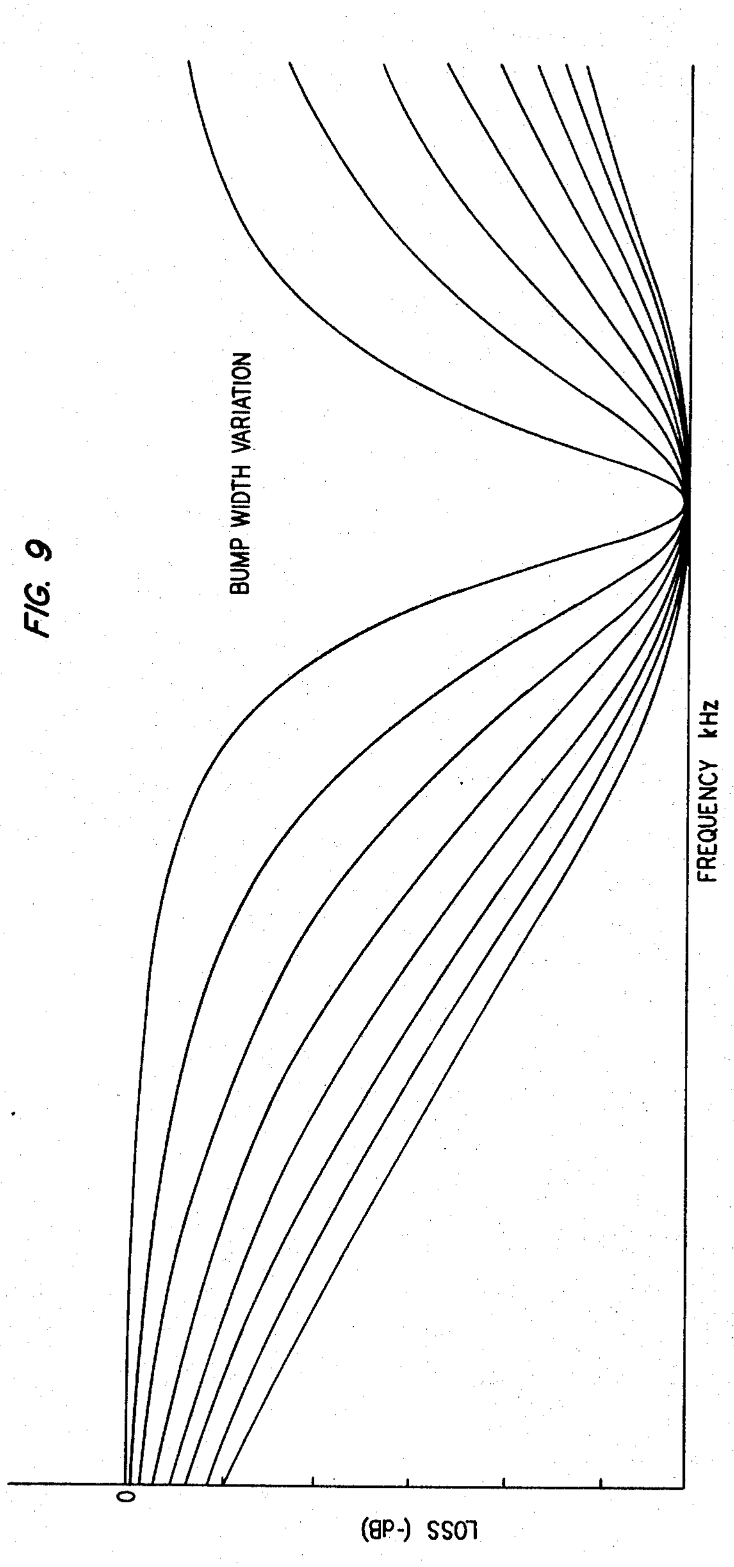
FIG. 9 illustrates a family of various equalizer bump shapes, having different widths, obtained by this invention.
Figure 10:
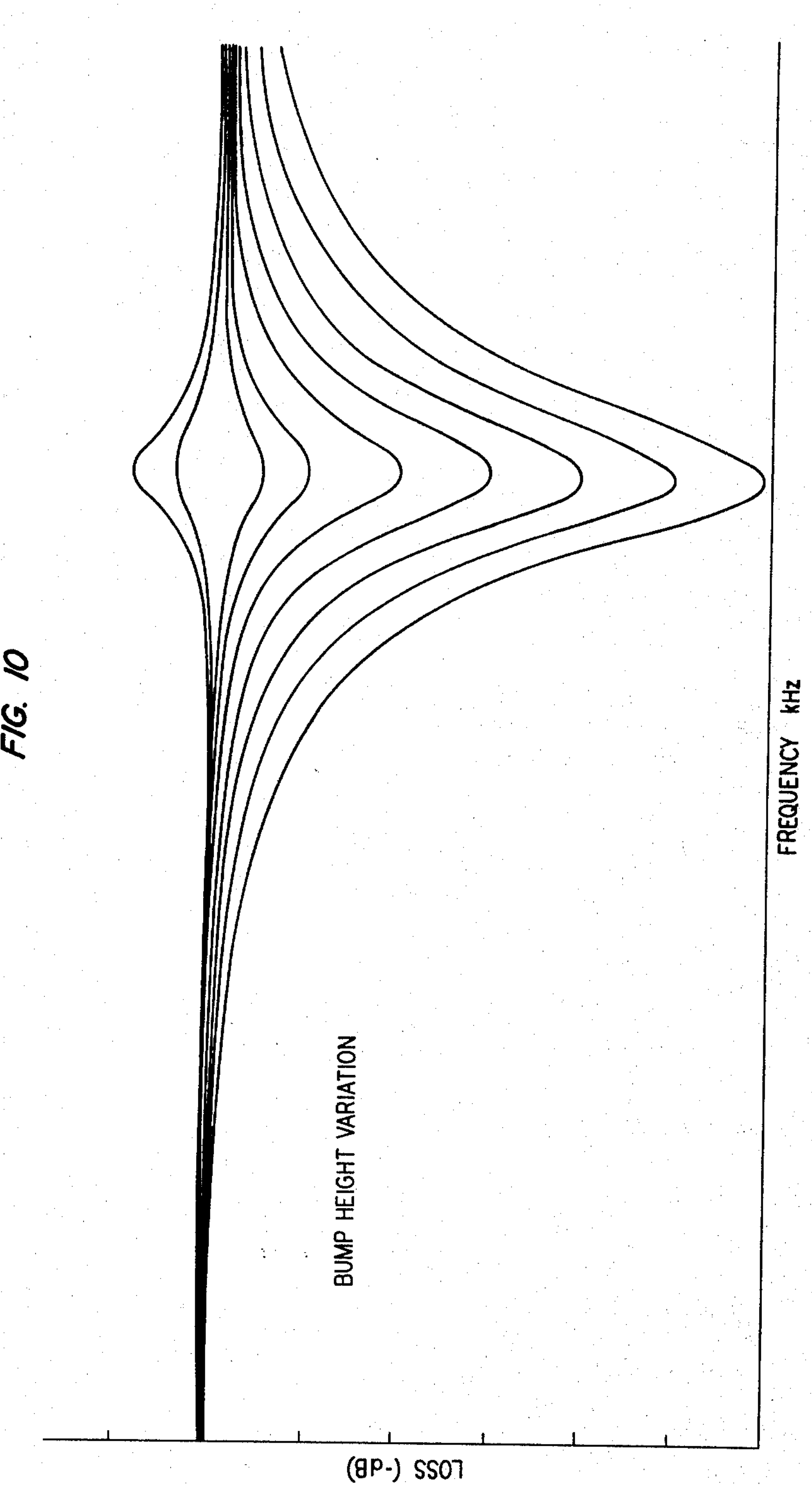
FIG. 10 illustrates a second family of equalizer bump shapes, having various heights, obtained by this invention.

Typical bump transfer functions characterized by Eq. (3) are shown in FIGS. 9 and 10.

As defined by expression (4*a*), the bump width is the bandwidth determined solely by the poles of the transfer function. It will be noted that the bump height is defined by expression (4*c*) as the magnitude of $T(s)$ at resonance, viz., $s^2=-\omega_o^2$. Although the peak of the transfer function does not occur precisely at $s=j\omega_o$, the effect of other terms is small enough to be considered negligible. It is one of the advantages of this invention that the bump height, bump width, and bump center frequency may all be independently varied by simply changing resistor values.

Since the equalizer of this invention may be used in a variety of different applications, it must be capable of providing a great diversity of transfer characteristics. As an illustrative example, the circuit of FIG. 3 provides 25 bump height adjustments, 25 bump width adjustments, and five center frequency adjustments. Since these are all independent, a total of 3,125 different bump shapes are available from one equalizer circuit. Thus, the likelihood of matching a given loss bump is much enhanced and fewer cascaded equalizer circuits are required to compensate for the loss of most cables. To obtain small size equalizers and production economy, the equalizer of FIG. 3 is advantageously realized as a thin film circuit with beam leaded operational amplifier chips bonded to the thin film substrate. Such technology is well known in the art and will not be discussed to avoid undue complication of this disclosure.

To realize the variable resistors required to obtain the various bump shapes, it has been found advantageous to use sliding double contact switches which move in channels in a plastic case enclosing the equalizer substrate and which make contact with the terminals of thin film resistors on the substrate. A similar type of sliding switch arrangement is shown in U. S. Pat. No. 3,551,872 issued to J. T. Emmott et al. on Dec. 29, 1970. Any other equivalent arrangements are suitable.

Figure 5:
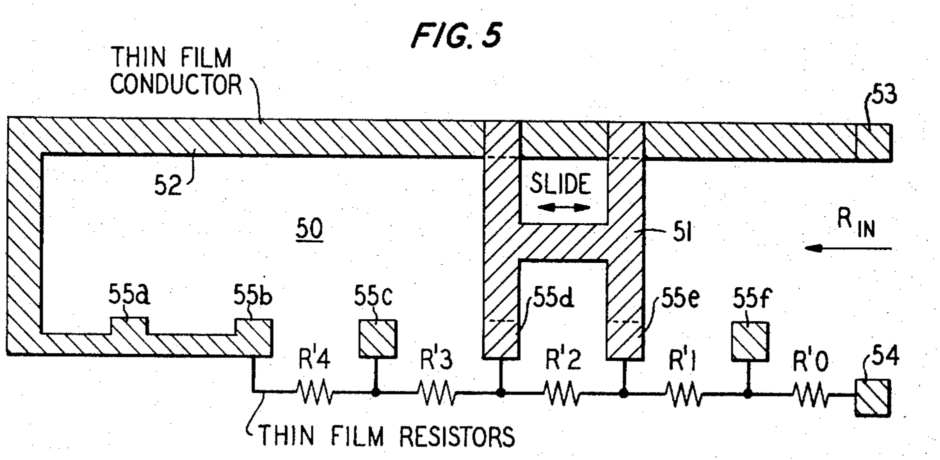
FIG. 5 depicts the manner in which a sliding switch may be used with thin film resistors to alter the total input resistance of such a resistive network configuration.

FIG. 5 is an illustrative drawing indicating the manner in which resistor values may be changed using a double contact sliding switch. As slide conductor 51 is moved from one end to the other of thin film resistive network assembly 50, the total resistance $R_{in}$ between terminals 53 and 54 increases from a value of $R_0'$ to $R_0'+R_1'+R_2'+R_3'+R_4'$. Thus, slide 51 shorts out any resistors which appear on the side of the slide farthermost from input terminals 53 and 54. Slide 51 has a double contact feature to allow simultaneous contact on conductor rail 52 and on conductor pads 55 to improve reliability, since failure of a single contact will result either in no change or a change in value of resistance to the next position in the effective resistor value range of $R_{in}$.

Figure 6:
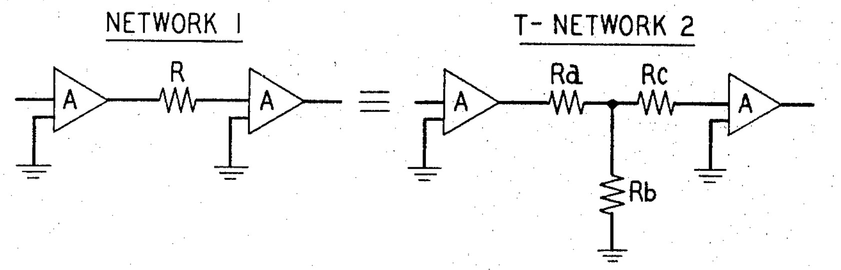
FIG. 6 illustrates a first network equivalence.

If the variable resistor mechanism of FIG. 5 were used in the straightforward manner indicated, each desired variable resistor value would require a distinct switch position; since the number of bump width and height adjustments is large, two, as per Eqs. (4*a*) and (4*c*), very long switches would be required, thus defeating the use of thin film technology to miniaturize the equalizer circuitry. In accordance with this invention, a much more efficient design is possible by replacing a single resistor with a T-network as shown in FIG. 6. It may be shown that network 1 and T-network 2 exhibit the same effective transfer resistance if $$R=R_a+R_c+R_aR_c/R_b. \quad (5)$$

By exploiting this equivalence, the effective value of the resistance R may be varied by changing any of the three resistors $R_a$, $R_b$, or $R_c$. In particular, if $R_a$ and $R_b$ are each realized using a five-position switch similar to that of FIG. 5, a total of 25 distinct equivalent resistor values R are available, thus obviating the need for a long, 25 position switch. Furthermore, in accordance with this invention, the successive equivalent resistive values of a switched network configuration may be made to form an approximate geometric series. This is a type of variation extremely advantageous in equalizer configurations since it realizes equal percent increments in the parameter being varied.

The manner in which this result is obtained is as follows. Let $R_c$ be fixed and let $R_a^{(i)}$, $i=0,1,2,3,4$ and $R_b^{(j)}$, $j=0,1,2,3,4$ represent the resistor values which $R_a$ and $R_b$ assume. Then, from Eq. (5), $$R_{ij}=R_o+R_a^{(i)}\left(1+\frac{R_o}{R_b^{(j)}}\right) \quad (6)$$

If we let $$R_a^{(i)}=R_a^{(o)}(1+\Delta)^{5i}, \quad (7)$$

and $$\left(1+\frac{R_o}{R_b^{(j)}}\right)=K^{(o)}(1+\Delta)^j \quad (8)$$

or $$R_b^{(j)}=R_c/K^{o}(1+\Delta)^j-1 \quad (9)$$

where $R_a^{(o)}$, Δ, and $K^{(o)}$ are predetermined design constants, then $$R_{ij} = R_c + R_a^{(o)} K^{(o)} (1+\Delta)^{5i+j} \quad (10)$$

$$i = 0,1,2,3,4$$

$$j = 0,1,2,3,4 .$$

A geometric progression of resistive values is thus developed except for the substantially negligible disturbance caused by the constant $R_c$ term. Note that resistor $R_b$ provides a vernier control and resistor $R_a$ produces larger resistive changes. It is also noteworthy that the roles of $R_a$ and $R_c$ could be interchanged if that proved advantageous.

Thus, to realize the desired height adjustment, a T-network, in accordance with FIG. 6, with adjustable resistors $R_{6a}$ and $R_{6b}$ and fixed resistor $R_{6c}$ is used to replace resistor $R_6$ of FIG. 4, as shown in FIG. 3. The switched resistor network configurations $H_1$ and $H_2$ have a direct symbolic correspondence with the structure of FIG. 5. Since the combination of switched networks $H_1$ and $H_2$ has 25 discrete positions, 25 discrete bump heights are provided in accordance with Eq. (4c).

Figure 7:
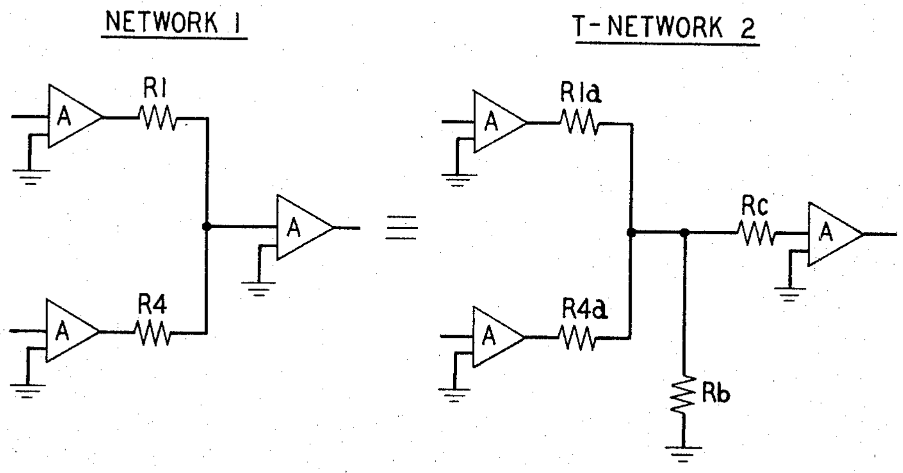
FIG. 7 illustrates a second network equivalence.

Reference to Eq. (4a) indicates that in order to alter the bump width, resistor $R_1$ of FIG. 4 must be varied. However, an additional problem is encountered since resistor $R_4$ has to track resistor $R_1$ as per Eq. (2c). The manner in which this problem is overcome, in accordance with this invention, is indicated in FIG. 7, which is an extension of the principles embodied in the network equivalence of FIG. 6. It may be shown that network 1 of FIG. 7 is equivalent to T-network 2 of FIG. 7, i.e., the effective transfer resistance is the same, if the following equations are satisfied:

$$R_1 = R_{1a} + R_c + (R_{1a}/R_{4a}) R_c + R_{1a}R_c/R_b, \quad (11)$$

and $$R_4 = R_{4a} + R_c + R_{4a}R_c/R_b + (R_{4a}/R_{1a}) R_c. \quad (12)$$

Now, if $$R_{4a} = R_{1a} = R_a, \quad (13)$$

then $$R_4 = R_1 = R_a + R_c (2 + R_a/R_b). \quad (14)$$

Thus, by varying $R_c$ and $R_b$, an approximately geometric bump width variation is obtained while the effective values of the resistors $R_1$ and $R_4$ are maintained equal. FIG. 3 illustrates how the combined network configuration of resistors $R_1$ and $R_4$, using sliding switch arrangements $W_1$ and $W_2$, has been substituted for resistors $R_1$ and $R_4$ of FIG. 4. Again, because of this novel arrangement, 25 discrete bump width values are obtained, without the use of long switches.

Figure 8:
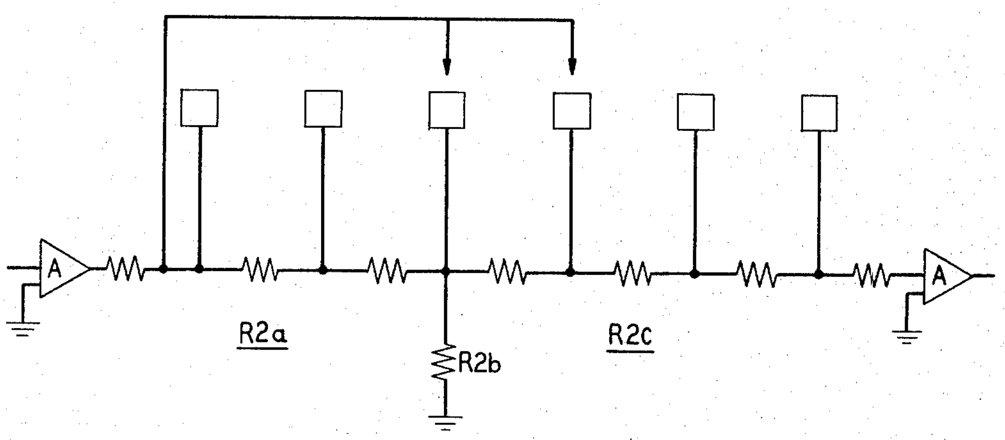
FIG. 8 illustrates a particular sliding switch resistive network configuration used in this invention.

As indicated by Eq. (4b), either resistor $R_2$ or resistor $R_3$ may be used to provide the desired bump resonant, i.e., center, frequencies. Amplifier overload considerations in a particular embodiment of this invention dictated that resistor $R_2$ be used as the adjustable element. However, a switched resistor configuration for resistor $R_2$, similar to that used for resistor $R_6$, was not possible because of the wide range of bump resonant frequencies desired. Since in a particular employment of this invention, the signal frequency range is 300 Hz to 3,200 Hz and $f_o(\omega_o/2\pi)$ is proportional to $1/\sqrt{R_2}$, the required range of values for resistor $R_2$ is 114 to 1. This range is much too large for thin film resistors since resistor $R_2$ must exceed a certain minimum value in order not to overload operational amplifier 12. To solve this problem, in accordance with this invention, resistor $R_2$ is replaced by a T-network structure, similar to that of FIG. 6, as illustrated in FIG. 8. This configuration exploits the double contacting property of the switching arrangement of FIG. 5 to obtain a wide range of resistive values. Thus, the combined switch and T-network configuration $F_1$ of FIG. 3 corresponds to resistor $R_2$ of FIG. 4.

FIGS. 9 and 10 illustrate exemplary equalizer bump shapes obtained by the use of the circuit of FIG. 3. FIG. 9, for example, illustrates a number of different bump shapes having different widths obtained by varying switches $W_1$ and $W_2$ of FIG. 3. FIG. 10, on the other hand, illustrates various bump shapes having different heights obtained by altering switches $H_1$ and $H_2$ of FIG. 3. Each bump of FIGS. 9 and 10 may also have its center frequency altered by the use of switch $F_1$ of FIG. 3.

What is claimed is:

1. Active RC adjustable loss equalizer apparatus having an input terminal and an output terminal comprising:
   - a first feedback amplifier having an input and output;
   - a first adjustable resistive T-network connecting said equalizer input terminal to the input and output of said first amplifier;
   - a second feedback amplifier having an input and output, said input resistively connected to the output of said first amplifier;
   - a third feedback amplifier having an input and output, said output resistively connected to the input of said first amplifier;
   - a second adjustable resistive T-network connecting the output of said second amplifier and the input of said third amplifier;
   - a fourth feedback amplifier having an input and output, said output connected to said equalizer output terminal;
   - a third adjustable resistive T-network connecting the output of said second amplifier and the input of said fourth amplifier;
   - and resistive circuit means coupling said equalizer input terminal, and the output of said first amplifier, to the input of said fourth amplifier.

2. The equalizer as defined in claim 1 wherein at least one of said resistive T-networks further comprises:
   - a first fixed resistive leg;
   - a second slideably adjustable resistive leg;
   - and a third slideably adjustable resistive leg.

3. The equalizer as defined in claim 1 wherein at least one of said adjustable resistive T-networks exhibits a geometric variation in effective resistance.

4. Active RC adjustable loss equalizer apparatus having an input terminal and an output terminal comprising:
   - a first operational amplifier having feedback means connected between said amplifier's input and output;
   - a first slideably adjustable resistive T-network connecting said equalizer input terminal to the input and output of said first operational amplifier;
   - a second operational amplifier having feedback means connected between said amplifier's input and output, said input resistively connected to the output of said first amplifier;

a third operational amplifier having feedback means connected between said amplifier's input and output, said output resistively connected to the input of said first amplifier;

a second slideably adjustable resistive T-network connecting the output of said second amplifier and the input of said third amplifier;

a fourth operational amplifier having feedback means connected between said amplifier's input and output, said output connected to said equalizer output terminal;

a third slideably adjustable resistive T-network connecting the output of said second amplifier and the input of said fourth amplifier;

and resistive circuit means coupling said equalizer input terminal, and the output of said first amplifier, to the input of said fourth amplifier.

5. The equalizer as defined in claim 4 wherein at least one of said resistive T-networks further comprises:

a first fixed resistive leg;

a second slideably adjustable resistive leg;

and a third slideably adjustable resistive leg.

6. The equalizer as defined in claim 4 wherein at least one of said adjustable resistive networks exhibits a geometric variation in effective resistance.

7. An adjustable loss equalizer having first, second, third, and fourth feedback operational amplifiers, an input terminal and an output terminal, comprising:

a first adjustable resistive T-network connecting said input terminal and the input and output of said first amplifier;

a second adjustable resistive T-network connecting the output of said second amplifier and the input of said third amplifier, the input of said second amplifier resistively connected to the output of said first amplifier, and the output of said third amplifier resistively connected to the input of said first amplifier;

a third adjustable resistive T-network connecting the output of said second amplifier and the input of said fourth amplifier, the output of said fourth amplifier connected to said output terminal;

and first resistive circuit means connecting said equalizer input terminal, and the output of said first amplifier, to the input of said fourth amplifier.

8. The equalizer as defined in claim 7 wherein at least one of said resistive T-networks further comprises:

a first fixed resistive leg;

a second slideably adjustable resistive leg;

and a third slideably adjustable resistive leg.

9. The equalizer as defined in claim 8 wherein at least one of said adjustable resistive T-networks exhibits a geometric variation in effective resistance.

10. An adjustable loss equalizer having first, second, third, and fourth feedback amplifiers, an input terminal and an output terminal, comprising:

a first slideably adjustable resistive T-network connecting said input terminal and the input and output of said first amplifier;

a second slideably adjustable resistive T-network connecting the output of said second amplifier and the input of said third amplifier, the input of said second amplifier resistively connected to the output of said first amplifier;

a third slideably adjustable resistive T-network connecting the output of said second amplifier and the input of said fourth amplifier, the output of said fourth amplifier connected to said output terminal;

first resistive circuit means connecting said equalizer input terminal, and the output of said first amplifier, to the input of said fourth amplifier;

and second resistive circuit means connecting the output of said third amplifier and the input of said first amplifier.

11. The equalizer as defined in claim 10 wherein at least one of said resistive T-networks further comprises:

a first fixed resistive leg;

a second slideably adjustable resistive leg;

and a third slideably adjustable resistive leg.

12. The equalizer as defined in claim 11 wherein at least one of said adjustable resistive T-networks exhibits a geometric variation in effective resistance.

13. An adjustable loss equalizer having first, second, third, and fourth feedback operational amplifiers, an input terminal and an output terminal, comprising:

a first discretely adjustable resistive T-network connecting said input terminal and the input and output of said first amplifier;

a second discretely adjustable resistive T-network connecting the output of said second amplifier and the input of said third amplifier, the input of said second amplifier resistively connected to the output of said first amplifier;

a third discretely adjustable resistive T-network connecting the output of said second amplifier and the input of said fourth amplifier, the output of said fourth amplifier connected to said output terminal;

first resistive circuit means connecting said equalizer input terminal, and the output of said first amplifier, to the input of said fourth amplifier;

and second resistive circuit means connecting the output of said third amplifier and the input of said first amplifier.

* * * * *